US006735704B1

(12) United States Patent
Butka et al.

(10) Patent No.: US 6,735,704 B1
(45) Date of Patent: May 11, 2004

(54) AUTONOMIC CONTROL OF POWER SUBSYSTEMS IN A REDUNDANT POWER SYSTEM

(75) Inventors: David Butka, Tucson, AZ (US); Brian Gerard Goodman, Tucson, AZ (US); Leonard George Jesionowski, Tucson, AZ (US); Michael Philip McIntosh, Tucson, AZ (US); Robin Daniel Roberts, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 09/693,384

(22) Filed: Oct. 20, 2000

(51) Int. Cl.[7] .................. G06F 1/26; H02J 1/00
(52) U.S. Cl. .............. 713/300; 713/330; 713/340; 307/86
(58) Field of Search ................. 713/300, 330, 713/340; 307/52, 64, 85, 86; 363/65

(56) References Cited

U.S. PATENT DOCUMENTS

| | | | | |
|---|---|---|---|---|
| 4,400,626 A | * | 8/1983 | Lacy ........................... | 307/66 |
| 4,659,942 A | | 4/1987 | Volp ............................ | 307/19 |
| 5,224,010 A | * | 6/1993 | Tran et al. ................... | 361/90 |
| 5,559,376 A | * | 9/1996 | Tachikawa .................. | 307/86 |
| 5,694,329 A | * | 12/1997 | Pomatto ..................... | 700/286 |
| 5,745,670 A | * | 4/1998 | Linde .......................... | 714/22 |
| 5,747,889 A | | 5/1998 | Raynham et al. ........... | 307/80 |
| 5,761,084 A | | 6/1998 | Edwards ..................... | 364/492 |
| 5,774,736 A | | 6/1998 | Wright et al. ............ | 395/750.07 |
| 5,809,311 A | | 9/1998 | Jones ...................... | 395/750.01 |
| 5,844,327 A | | 12/1998 | Batson ........................ | 307/64 |
| 5,909,583 A | | 6/1999 | Hayes et al. ............ | 395/750.01 |
| 5,917,250 A | * | 6/1999 | Kakalec et al. ............. | 307/18 |
| 5,917,253 A | * | 6/1999 | Rusnack ..................... | 307/64 |
| 6,018,204 A | * | 1/2000 | Kuruma ...................... | 307/64 |
| 6,153,946 A | * | 11/2000 | Koch et al. ................. | 307/64 |
| 6,301,133 B1 | * | 10/2001 | Cuadra et al. .............. | 363/65 |
| 6,396,169 B1 | * | 5/2002 | Voegeli et al. ............. | 307/52 |
| 6,448,672 B1 | * | 9/2002 | Voegeli et al. ............. | 307/52 |
| 6,504,266 B1 | * | 1/2003 | Ervin ........................... | 307/29 |
| 6,546,494 B1 | * | 4/2003 | Jackson et al. ............. | 713/300 |

FOREIGN PATENT DOCUMENTS

| | | | |
|---|---|---|---|
| EP | 1030429 A2 | * | 8/2000 |
| JP | 408320742 A | * | 12/1996 |

OTHER PUBLICATIONS

Franz L. Worth et al., "Advanced Electrical System (AES)" IEEE 1990, pp 400–403.*
M. Muslu et al., "An Expert System for Contingency Analysis in Power Systems" IEEE 1990, pp 373–380.*

* cited by examiner

Primary Examiner—Thomas Lee
Assistant Examiner—Chun Cao
(74) Attorney, Agent, or Firm—Edmund Paul Pfleger; Hayes Soloway Hennessey Grossman & Hage PC; Allen K. Bates

(57) ABSTRACT

A power management system and method for multiple redundant power supplies. The present invention provides management and control of N+M power supplies, where N represents the minimum number of power supplies required and where M is the number of redundant power supplies (M>1), where any one of the power supplies may be capable of supplying power to all the loads of the power subsystems. In the preferred embodiment each power subsystem includes a power supply and a controller coupled to a power bus. A communication bus is provided common to each power subsystem. During reset or power-on periods, the controllers are programmed to uniquely delay the start time of each power supply, thereby protecting against an overcurrent/overvoltage condition on the power bus during reset periods. A master controller is provided to monitor normal operating conditions of the power subsystems and communication bus. The master controller is programmed to ensure that a predetermined number of power supplies are coupled to the power bus, even in the event of total or partial communication failure.

24 Claims, 3 Drawing Sheets

AUTONOMIC CONTROL OF POWER SUBSYSTEMS IN A REDUNDANT POWER SYSTEM

BACKGROUND OF THE INVENTION

1. Field of the Invention

The present invention relates to power management in a redundant power system. More particularly, the present invention relates to a power management scheme in a redundant power system where more than one redundant power supplies are available to a power bus. Particular utility for the present invention is power management for the IBM Tape Library System such as described in U.S. Pat. No. 6,356,803; the present invention has general applicability to any high-reliability system that utilizes multiple redundant power subsystems.

2. Description of Related Art

Many high reliability systems require redundant power to permit the system to continue normal operations in the event of a power subsystem failure. A common approach involves a technique called N+1, where N is the number of required power subsystems (based on the power demands of the system) and the +1 indicates that there is a single back up power subsystem. While this methodology is convenient for some designs, there are cases where more than one back up power system may be desired, or even required.

Certain problems are associated with power subsystems that involve more redundancy than N+1. For example, the power must be dynamically managed to ensure that too much power is not placed on the power bus (which can create a serious safety hazard). System complexity further increases when the power subsystems are located apart from each other. In order to effectively manage power under these conditions, a communication channel must be established between power subsystems. However, communication channels are equally susceptible to failure, and/or loss of connectivity between the power nodes. Thus, there is a need for power management in a redundant power system that eliminates or reduces single points of failure and maintains safe levels of power on the power bus.

SUMMARY OF THE INVENTION

Accordingly, the present invention provides power management for multiple redundant power supplies in an N+M system, where N represents the minimum number of power subsystems required to power all the subsystems and M represents the number of redundant power supplies available (M>1). During reset periods of one or more of the power subsystems, the present invention permits autonomous control of the individual power subsystems to couple a power supply to a power bus (if power is required) based on the power condition of the power bus. During normal operation, the present invention provides global control over the operating conditions of each of the power subsystems to ensure that a predetermined number of redundant power supplies are coupled to the power bus.

In one exemplary embodiment, the present invention provides a redundant power supply management system that includes a plurality of power subsystems each comprising a power supply and a controller for controlling the activation of each power supply, a power bus coupled to each power supply, a master controller, and a communications bus coupled to-said power subsystem and the master controller. Further, during a reset period of the power subsystem, each controller is adapted to monitor the power state of the power bus and couple a power supply to the power bus if the power bus requires power, thereby ensuring a minimum of one power supply connected to the power bus. Additionally, the master controller is adapted to monitor the power subsystems and couple a predetermined number of power supplies to the power bus, thereby ensuring a number of redundant power supplies available to the power subsystems.

In another exemplary embodiment, the present invention provides a system for controlling a plurality of power supplies in a redundant system that includes a plurality of power supplies selectively coupled to a common power bus, a controller associated with each power supply for sending commands to each power supply, and a master controller coupled to each power supply for sending commands to each power supply. The controller is operable during a reset period to command the power supply to couple to the power bus if the power bus requires power. The master controller is operable during periods other than said reset period to couple a predetermined number of power supplies to the power bus based on status information received from the power supplies.

In preferred embodiments, the master controller is further adapted to monitor each said power subsystem to determine which said power subsystems fail to communicate with said master controller, and upon such failure, said master controller further adapted to determine the number of power subsystems that confirm to be supplying power to said power bus, and if the sum of said failed subsystems and said confirmed subsystems is less than a predetermined number, said master controller instructing an additional power subsystem to couple a power supply to said power bus.

Also in preferred embodiments, the controller is adapted to control the activation of said power supply only during a reset or power-on period of said power subsystem, wherein said master controller adapted to control the activation of each said power supply at all other times other than said reset or power-on period. Preferably, each said power subsystem has a unique identification number, and a delay time based on said unique identification number. For example, the delay time can be defined as: Delay(sec)=2 (power subsystem number−1).

The present invention also provides an exemplary method for managing multiple redundant power supplies, comprising the steps of:

- controlling a plurality of power supplies to selectively couple each said power supply to a power bus to supply power;
- during a reset period for each said power supply, the step of controlling further comprising the step of coupling said power supply to said power bus if said power bus requires power; and
- during time periods other than said reset period, the step of controlling further comprising the step of coupling a predefined number of said power supplies to said power bus.

It will be appreciated by those skilled in the art that although the following Detailed Description will proceed with reference being made to preferred embodiments, the present invention is not intended to be limited to these embodiments. For example, it should be understood from the outset that preferably the functional components of the preferred embodiments of the system of the present invention are embodied as one or more conventional general purpose processors, and including associated memory (e.g., ROM/RAM, disk drive, Flash Memory, etc.) for storing the instructions to operate the processors in the manner described herein.

DETAILED DESCRIPTION OF THE EXEMPLARY EMBODIMENTS

Power Management With Multiple Redundant Power Supplies

Figure 1:
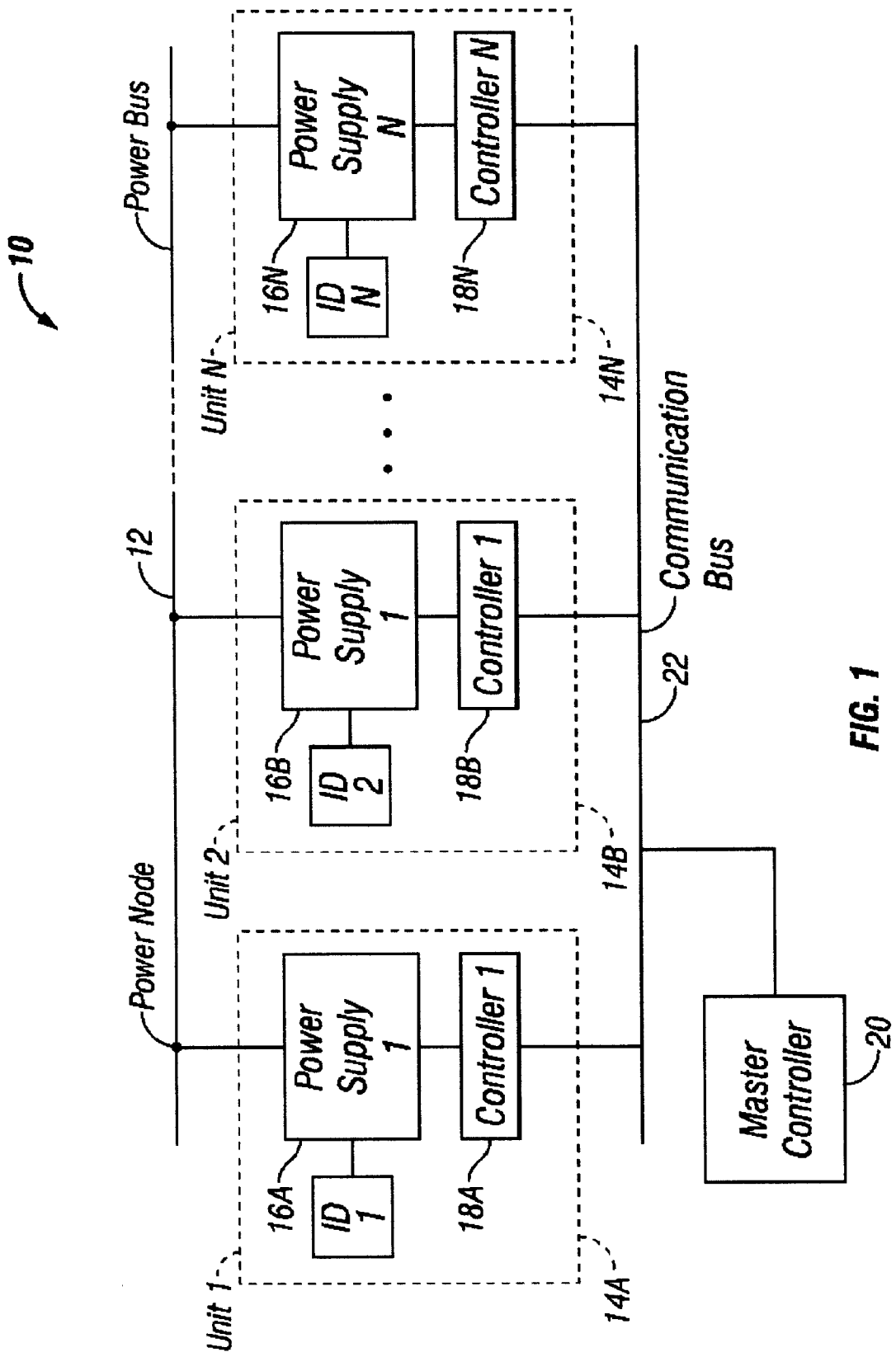
FIG. 1 is a block diagram of a power management system in a redundant power system according to the present invention.

FIG. 1 is a block diagram representation 10 of power management in a redundant power system according to the present invention. As a general overview, the system comprises a plurality of units or power subsystems, 14A, unit 14B . . . unit 14N, each being coupled to a power bus 12 at a power node. Each unit of the present invention includes a power supply 16A, 16B . . . 16N that is capable of supplying power along the power bus 12. As will be described in greater detail below, each unit also comprises a controller 18A, 18B . . . 18N, respectively, which monitors the state of the respective power supply and the power condition on the power bus 12. In the preferred exemplary embodiment, each unit is coupled to a communications bus 22 to permit communication between each unit, including the status state of each power supply. Also in the preferred exemplary embodiment, a master controller 20 is provided to supply commands and data along the communications bus 22 to each unit (i.e., each controller 18A, 18B . . . 18N of each unit) to control the operation thereof during certain periods of operation, as defined below. Also, the communications bus permits the controller 18A, 18B . . . 18N to transmit status messages to the master controller 20 along the communication bus 22. The status messages can include, for example, status information including the operational status of the communication bus, the operational conditions of the power supply associated with each controller, failure reports of power supplies, and/or other data associated with the power supplies and/or power subsystems. The present invention identifies two critical time periods for controlling the activation state of any or all of the power supplies connected to the power bus: (1) when a particular power subsystem (i.e., unit) resets, or initially comes on-line or available, and (2) during a steady state operation of each power supply to ensure that a minimum number of redundant power supplies are coupled to the power bus and supplying power. It should be noted at the outset that each unit depicted in FIG. 1 represents an atomic subsystem of a distributed system, where each power supply of each subsystem is capable of supplying power along the power bus 12 to supply power to all units in the system. Each subsystem further comprises a load (not shown) that is driven by the power supply coupled to the power bus. It should be further noted that each unit could comprise more than one power supply for supplying power to the entire system. The present invention is intended to control a plurality of power supplies coupled to a- power bus 12. In the present invention, N represents the number of required subsystems that can be coupled to the power bus, for example, the unit designations shown in FIG. 1. M represents the number of redundant power supplies in the system, and since any one of the power supplies is capable of providing power to the whole system, M is therefore greater than 1.

Power Subsystem Reset Period

Controllers 18A, 18B . . . 18N coupled to each power supply 16A, 16B . . . 16N of each power subsystem (Unit) in the system shown in FIG. 1 are adapted to send commands and data along the communication bus 22 to communicate information about the status of each power supply to the other controllers, and to the master controller 20. Additionally, each controller is adapted to couple the power supply to the power bus (thereby supplying power on the power bus) in the absence or failure of the communication bus 22. Thus, each controller for each power supply, in the preferred embodiment of the present invention, can autonomously supply power to the power bus, even in the event of a communication bus failure. In the preferred embodiment, when a particular power node resets or first comes online, the controller for that power node delays supplying power to the bus for a predetermined period of time. Preferably, the delay period is related to the number of known power nodes in the system, and is based on a unique identification number assigned to each power node (power subsystem). For example, the following delay equation could be used: $Delay_{sec}=2$ (power subsystem number$-1$). This ensures that each node will complete their delay at different times from each other, thereby ensuring that in the event more than one such power supply is simultaneously coming online, each power supply will not be permitted to attempt to supply power to the bus at the same time. Of course, the equation listed above is cited only as an example, and those skilled in the art will recognize numerous modifications thereto, all of which are deemed within the spirit and scope of the present invention. Accordingly, in a preferred embodiment, each power node (i.e., each subsystem including a power supply) includes a unique identification number.

Once the delay time for a particular power node has ended, the controller for that particular power node monitors the power bus for the presence of power. If the bus has power, it is assumed that another node is supplying power to the bus and the controller will not turn on the power supply. In this way, it is ensured that no more than one power supply is coupled to the bus during a power up cycle or reset period. Moreover, it is ensured that even in the absence of communication between power nodes along the communication bus 22 (due to, for example, a communication system failure) at least one power supply is coupled to the power bus power to deliver power.

Figure 2:
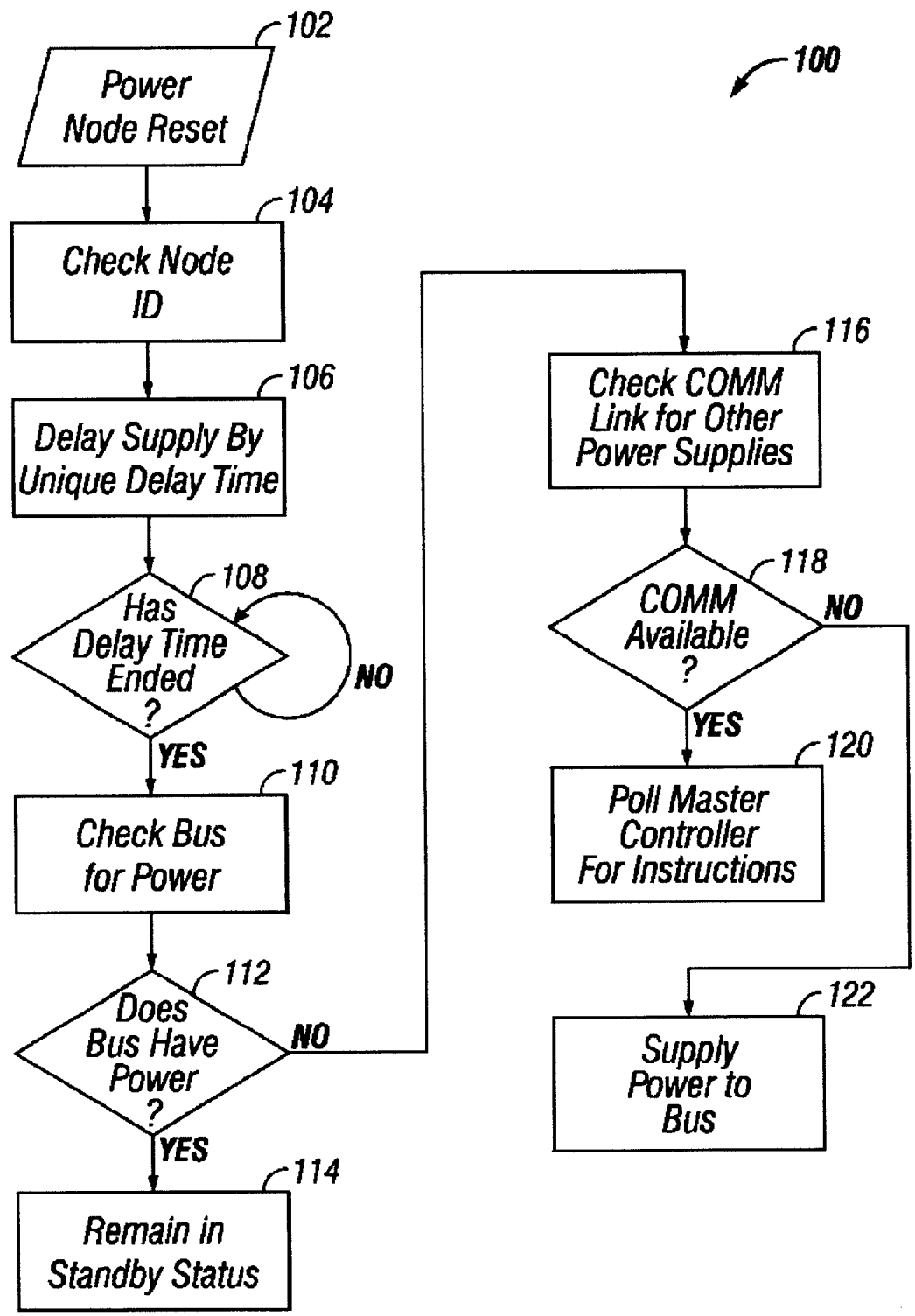
FIG. 2 is a flowchart for controlling power along the power bus during a power subsystem reset according to the present invention.

FIG. 2 depicts a flowchart 100 depicting the preferred steps for coupling a power supply to the power bus during a power node reset. For clarity, reference numerals for the elements of the system 10 depicted in FIG. 1 are omitted. Power node reset 102 includes those times in which the power supply of each subsystem is off and then turned on, or cycled on from an inactive state (e.g., sleep mode or power saving mode state). Upon reset, the controller checks the ID associated with that particular power node 104. Using that power node number determined in step 104, the controller for the power supply under reset condition delays activation of that power supply by a unique delay time 106. The unique delay time can be created, for example, using the equation listed above or can include a randomly generated delay time. The power supply is not activated, if at all, until the delay time has ended 108. When the delay time ends, the controller checks the power bus to determine if power is already supplied along the bus 110. If the bus has power 112, the controller instructs that power supply to remain in a standby status 114. If the bus does not have power 112, the controller can instruct the power supply to begin delivering power to the power bus (not shown directly in FIG. 2). Or, if the bus does not have power, it may be preferable for the controller to check the communication link between subsystems for the presence of other power supplies 116. Thus, initially, the controller may check if a communication link is indeed available. If a communication link is available, it may be desirable to poll a master controller for instructions 120 as to whether or not to activate the power supply associated with the controller, or await instructions from the master controller. However, if no communication link is available, and the bus does not have power, the controller can be adapted to supply power to the bus 122. It should be noted that steps 116 through 120 described above are not necessary to implement the present invention, but may be desirable to offer more flexibility and control over the power supplies during power-on or reset periods. Although not shown in the drawing, it may be further desirable for each controller to perform a self-check of the power supply associated with that controller before that power supply is permitted to supply power to the power bus. For example, if a power supply is determined as being unfit (e.g., supplying too little or too much power due to an unspecified internal failure of the power supply), that power supply will not be coupled to the bus. Rather, after the delay period, the controller operates to remove that power supply from the system, thereby permitting another subsystem to supply power to the bus.

Steady State Power Management

Another critical period defined by the present invention includes management and control of a plurality of redundant power supplies during normal operation periods (e.g., non power-up or reset periods). In this period, the preferred redundant power management system and process of the present invention utilizes the master controller 20 to determine the state of the communications bus 22 and the state of each power node 14A, 14B . . . 14N to determine and control which of these power nodes are supplying power to the power bus. However, in the event of a total or partial communications bus failure, the present invention implements a control process to ensure that at least one power supply is supplying power and that no more than some predefined maximum number of power supplies are supplying power (i.e., to prevent an overcurrent/overvoltage condition on the power bus). Also, it may be desirable to ensure that a minimum number of power supplies are coupled to the bus so that the failure of one (or more) will not interrupt power to the subsystems. As described above, during a reset or power on period for any or all of the power supplies, the unique delay period ensures that one, and only one, power supply is coupled to the bus. Thus, as alluded to above, controllers 18A, 18B . . . 18N are preferably permitted to control the state (coupled or decoupled from the power bus) only during initial periods defined as a reset or power on period. At all other times, the present invention utilizes master controller 20 to control and manage the power supplies in each of the subsystems (units), as described below.

Figure 3:
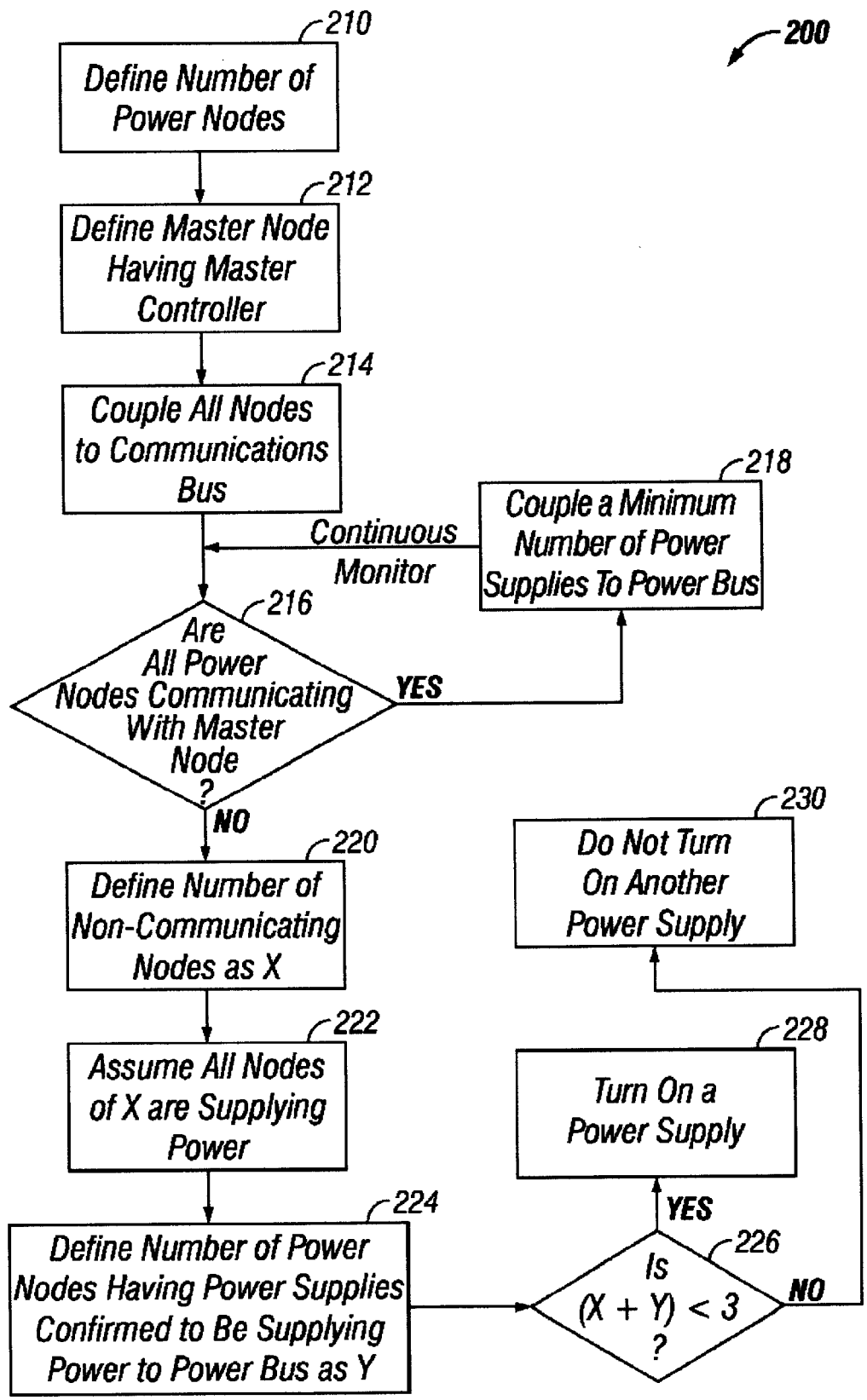
FIG. 3 is a flowchart for controlling power along the power bus during steady state operations of a plurality of redundant power supplies according to the present invention.

FIG. 3 depicts a flowchart 200 of exemplary power supply management and control during steady state, or normal, operating conditions. For clarity, reference numerals for the elements of the system 10 depicted in FIG. 1 are omitted. As described above, the following process is preferably executed by the master controller. The master controller determines and defines the number of power nodes that are capable of supplying power to the power bus 210. Since the present invention is intended to be scalable, the number of power nodes are permitted to increase (by adding units and/or power supplies) or decrease (by subtracting units and/or power supplies), and the master controller simply keeps a count of the number of total power nodes in the system. Since it is preferable that, other than at reset periods, no one power node can autonomously control coupling a power supply to the power bus (since the present invention assumes that the communication bus is not always operational or accurate), a master node is defined having a master controller 212. The power nodes and the master, node are coupled to a communication bus 214. The master controller polls each power node to determine if all the power nodes are communicating properly with the master node 216. If proper communication is established with each power node, the master controller instructs a predefined number of power subsystems to couple a minimum number of power supplies to the power bus 218. In this manner, it is ensured that in the event of a failure of an active power supply there is no discontinuity of power. Accordingly, to balance maximum redundant effect without unnecessarily creating an over-power condition on the power bus, it is preferable that the number of power supplies coupled redundantly in this step is 3. The master controller continuously monitors the power nodes in this manner. If proper communication is not established between the master node and the power nodes since the last reset of that power node, the master controller assumes a total or partial failure of the communications bus. In this event, the master controller defines, by count, the number of non-communicating power nodes as X (since the total number of power nodes is known) 220. Moreover, the master controller assumes that all the power nodes in the X-group are supplying power 222. If some of the remaining power nodes are still in communication with the master controller, the master controller defines the number of these power nodes that confirm to be supplying power to the power bus as Y 224. Next, it is desirable to ensure that there is both at least one power supply coupled to the power bus and that there are not too many power supplies coupled to the power bus (defined as a predetermined maximum).

Accordingly, the master controller determines if (X+Y) <3, step 226. If this equation is true, the master controller instructs a power supply to turn on and supply power to the power bus 228 (obviously this instruction is not sent to a member of the X-group). Since all of the non-communicating nodes of the X-group are assumed to be supplying power, this ensures that at least one power supply is supplying power even if none of the X-group power supplies are, in fact, operational. If (X+Y) is equal to or greater than 3, no instruction is sent by the master controller to turn on a power supply 230. The system continues monitoring as shown in step 216. Again, since there is an assumption that all of the X-group power supplies are supplying power, this ensures that an excessive number of power supplies are not supplying power. Note that in this circumstance, at least one of the X-group power supplies or the Y-group power supplies is supplying power, since the last reset or power on period (FIG. 2) ensured that at least one power supply is supplying power.

A specific implementation of the above described system and process may include power management and control for the IBM 3584 Tape Library System manufactured and sold by IBM, Inc., and as described in U.S. Pat. No. 6,356,803, titled "Automated Data Storage Library Distributed Control System", assigned to the same assignee, and hereby incorporated by reference in its entirety. As an overview, this patent application discloses a control system for a scalable tape library system. The system includes a primary unit, called an L-Frame, that provides one (or more) power supplies and a plurality of tape drive mechanisms. Additional units (called D-Frames) can be added, wherein each additional frame includes at least one power supply. Each power supply is capable of supplying power to the entire system along a unified power bus. A communications bus is provided to exchange commands and data between the L-Frame unit and the D-Frame units. As more frames are added, the number of redundant power supplies likewise increases. The present power management system, as described herein, can be implemented in such a system to control and manage the power supplies of the L-Frame unit and the D-Frame units coupled to the power bus.

Thus, it is evident that there has been described a redundant-power management and control system and method in accordance with the aims and objectives stated herein. Those skilled in the art will recognize that controllers 18A, 18B . . . 18N and master controller 20 can be constructed out of custom and/or conventional hardware and/or software, and may include a programmed microprocessor-based controller or a state-machine controller configured in accordance with the above-described power management process. The communications bus 22 can include any known conventional or proprietary bus technology, for example, standard TCP/IP network communications, one-wire bus systems (e.g., serial communication bus, etc), or other communication bus systems known in the art. To that end, those skilled in the art will recognize that each controller 18A, 18B . . . 18N and master controller 20 is appropriately adapted with interface hardware/software to permit communications along the communication bus. Also, since each power node preferably comprises a unique identification, it may be desirable to assign that number based on the network ID.

The above-described invention provides that controllers 18A, 18B . . . 18N know the condition on the power bus prior to instructing the associated power supply to turn on. Thus, it should be recognized that each of these controllers is appropriately modified with circuitry to read the voltage and/or current on the bus. Such circuitry may include a sense resistor and a current or voltage feedback amplifier to generate a signal to the controller indicative of the state of the power bus. The circuitry may further include an A/D converter to generate a digital signal to the controller.

Those skilled in the art will recognize that numerous modifications can be made to the present invention. For example, the communications bus 22 and/or power bus 12 may be expanded to include multiple redundant bus systems. Other modifications may also be made. For example, although the master controller shown in FIG. 1 is not associated with a power supply, it is to be understood that the master controller may be provided as a power node. Also, although the above description references coupling a single power supply after reset, it may be desirable to couple more than one power supply after reset. If, for example, a power supply is supplying less than the required power, the present invention can be adapted to turn on additional power supplies to meet the requirement. Also, if it is determined that a particular power supply is supplying too much power, the controller of the present invention can be adapted to turn off that power supply and instruct another power supply to turn on. Additionally, although- the description of FIG. 3 describes the preferred operation of the master controller to ensure that the minimum number of power supplies coupled to the bus is 3, it is intended that the present invention can be generalized to more than or less than 3.

The foregoing description detailed redundant power management for multiple redundant power supplies, even in the event of a communications failure (partial or total). It should be readily evident that the master controller of the present invention can be equally adapted to control the steady state operation of the power subsystems when the communications channel is fully operation. For example, the master controller can be adapted to turn on a power supply in the event that a given power supply indicates a supply failure. These and other modifications will become apparent to those skilled in the art, and all such modifications are deemed within the spirit and scope of the present invention, as defined by the appended claims.

What is claimed is:

1. A redundant power supply management system, comprising:
   a plurality of power subsystems each comprising a power supply and a controller for controlling an activation of each said power supply;
   a power bus coupled to each said power supply;
   a master controller; and
   a communications bus coupled to each said power subsystem and said master controller;
   wherein, during a reset period of said power subsystem, said controller adapted to monitor a power state of the power bus and couple said power supply to said power bus if said power bus requires power; and wherein said master controller adapted to monitor said power subsystems and couple a predetermined number of said power supplies to said power bus.

2. A system as claimed in claim 1, wherein each said controller further adapted with a unique delay time, said delay time defining a period from the start of a reset operation to the start of said monitoring of said power bus.

3. A system as claimed in claim 1, wherein said master controller further adapted to monitor each said power subsystem to determine which said power subsystems fail to communicate with said master controller, and upon such failure, said master controller further adapted to determine the number of power subsystems that have confirmed to be supplying power to said power bus, and if the sum of said failed subsystems and said confirmed subsystems is less than a predetermined number, said master controller instructing an additional power subsystem to couple a power supply to said power bus.

4. A system as claimed in claim 3, wherein said predetermined number is 3.

5. A system as claimed in claim 1, wherein said controller adapted to control the activation of said power supply only during a reset or power-on period of said power subsystem.

6. A system as claimed in claim 5, wherein said master controller adapted to control the activation of each said power supply at all other times other than said reset or power-on period.

7. A system as claimed in claim 2, wherein each said power subsystem having a unique identification number, and said delay time based on said unique identification number.

8. A system as claimed in claim 7, wherein said delay time defined as:

$$\text{Delay(sec)}=2(\text{power subsystem number}-1).$$

9. A method for managing multiple redundant power supplies, said method comprising the steps of:

controlling a plurality of power supplies to selectively couple each said power supply to a power bus to supply power;

during a reset period for each said power supply, said step of controlling further comprising the step of coupling said power supply to said power bus if said power bus requires power; and during time periods other than said reset period, said step of controlling further comprising the step of coupling a predefined number of said power supplies to said power bus.

10. A method as claimed in claim 9, said reset period further comprising the steps of:

delaying coupling of each said power supply to said power bus by a unique delay period for each said power supply;

monitoring said power bus to determine if said power bus requires power; and coupling said power supply after said delay if said power bus requires power.

11. A method as claimed in claim 10, further comprising the steps of:

assigning a unique identification number to each said power supply; and generating said delay based on said unique identification number.

12. A method as claimed in claim 9, further comprising the steps of:

coupling said power supplies to a communication bus; and monitoring said communication bus for the presence of each said power supply.

13. A method as claimed in claim 12, wherein during time periods other than said reset period, said method further comprising the steps of:

establishing a master node along said communication bus and common to each said power supply;

determining the number of power supplies that fail to communicate with said master node;

determining the number of power supplies that confirm to be supplying power to said power bus; and determining if said non-communicating power supplies and said confirmed power supplies is less than a predetermined number.

14. A method as claimed in claim 13, wherein said method further comprises the step of:

sending a command along said communication bus to an additional power supply to instruct that power supply to couple to said power bus if said predetermined number is greater than the sum of said non-communicating power supplies and said confirmed power supplies.

15. A system for controlling a plurality of power supplies in a redundant system, comprising:

a plurality of power supplies selectively coupled to a common power bus;

a controller associated with each said power supply for sending commands to each said power supply; and a master controller coupled to each said power supply for sending commands to each said power supply;

wherein, said controller operable during a reset period to command said power supply to couple to said power bus if said power bus requires power; and wherein, said master controller operable during periods other than said reset period to couple a predetermined number of said power supplies to said power bus based on status information received from said power supplies.

16. A system as claimed in claim 15, further comprising a common communications bus coupled to each said controller and said master controller, and said status information including an operational status of the communication bus.

17. A system as claimed in claim 15, wherein said status information comprising the ability of each said power supply and said controller to communicate with said master controller.

18. A system as claimed in claim 15, wherein said master controller further operable to monitor each said power supply to determine which said power supplies fail to communicate with said master controller, and upon such failure, said master controller further operable to determine the number of power supplies that confirm to be supplying power to said power bus, and if the sum of said non-communicating supplies and said confirmed supplies is less than a predetermined number, said master controller instructing an additional power supply to couple to said power bus.

19. A system as claimed in claim 18, wherein said predetermined number is 3.

20. A system as claimed in claim 15, wherein said controller adapted to control the activation of said power supply only during a reset or power-on period of said power supply.

21. A system as claimed in claim 20, wherein said master controller adapted to control the activation of each said power supply at all other times other than said reset or power-on period.

22. A system as claimed in claim 15, wherein each said controller operable to monitor a power condition on said power bus during said delay time and to generate unique delay time, said delay time defining a period from the start of said reset period to when the controller monitors said power condition on said power bus.

23. A system as claimed in claim 22, wherein each said power supply having a unique identification number, and said delay time based on said unique identification number.

24. A system as claimed in claim 23, wherein said delay time defined as:

Delay(sec)=2(power supply identification number−1).

* * * * *